3,467,525
PROCESS FOR MAKING AN ANIMAL FOOD
Douglas Hale, Creve Coeur, and Ronald J. Flier, Glendale, Mo., assignors to Ralston Purina Company, St. Louis, Mo., a corporation of Missouri
No Drawing. Filed Dec. 14, 1964, Ser. No. 418,266
Int. Cl. A23k 1/00
U.S. Cl. 99—2                                    6 Claims

ABSTRACT OF THE DISCLOSURE

An improved animal food is produced through preparation of a product in which a preponderant percentage, 80–95%, of the particles or pellets are coated on the surface thereof and impregnated into the interior thereof with a liquefiable fat and the balance of the particles or pellets, 5–20%, are coated with a thickening agent which is readily soluble in water.

---

This invention relates to an improved animal food and process for manufacturing animal food, and more particularly to an improved animal food in particulate or pelleted form and in which the preponderant percentage of the particles or pellets are coated and impregnated with a liquefiable fat and the balance of the particles or pellets are coated with a thickening agent readily soluble in water.

Among the several objects of this invention may be noted the provision of an improved process for manufacturing animal food in particulate or pelleted form; the provision of such a process which produces an animal food in particulate or pelleted form in which all particles or pellets are surface coated with either a liquefiable fat or a readily water-soluble thickening agent, the fat and the thickening agent being readily contactable by water to form a flavorful, thickened mixture palatable to dogs, cats and other animals; the provision of a process of this character which produces an animal food in which the fat coated and impregnated particles or pellets are relatively nongreasy in appearance and in which both the fat coated and impregnated pellets and the pellets coated with a thickening agent are palatable to animals; the provision of a process of the type described which may be economically carried out using relatively simple equipment and which may be conveniently controlled to produce an animal food product of uniform quality; and the provision of an animal food product in particulate or pelleted form which possesses improved properties. Other objects and features will be in part apparent and in part pointed out hereinafter.

The invention accordingly comprises the products and methods hereinafter described, the scope of the invention being indicated in the following claims.

Heretofore, certain meal type dog and animal foods have been produced which, while being generally useful for their intended purpose, exhibit certain shortcomings which detract from their full utility. For example, one such prior art animal food of this type is prepared by extruding a gelatinized farinaceous mixture under pressure, drying and cooling the extruded product and coating its surface with a fat and a gravy-forming and thickening material. The resulting product is characterized by a surface coating of fat with a portion of the gravy-forming and thickening material on the surface of the fat and a portion absorbed by and embedded in the fat. As a result, upon being contacted with water or other aqueous liquids at normal use temperatures, only the thickening agent on the surface of the fat is readily available for dissolution to produce a gravy or thickened aqueous mixture, the thickening agent absorbed by or embedded in the fat being available for dissolution only upon partial or complete liquefaction of the fat. Thus, this prior art product does not have all of the thickening agent readily and immediately available for dissolution upon being contacted by water or other aqueous liquids.

In accordance with the present invention, it has now been found that an improved animal food product in particulate or pelleted form may be produced and the above noted prior art shortcomings avoided by preparing an animal food in which a preponderant percentage of the particles or pellets have a coating of a fat and the balance of the particles or pellets are coated with a thickening agent which is readily soluble in water. By providing an animal food composed of such a mixture of pellets, the thickening agent on the pellets coated therewith may be advantageously dissolved in a relatively short period of time upon being contacted with water to provide a thickened aqueous mixture or gravy and, depending upon the temperature of the water used, the fat coated on the other pellets of the mixture may be readily liquefied. Thus, the present invention provides an animal food product in which substantially all of the thickening agent incorporated in the product is readily and immediately available for rapid dissolution upon being contacted by water and the fat coating on the other pellets of the product is immediately available for rapid liquefaction upon being contacted with water at the proper temperature. This permits a flavorful, thickened animal food mixture having a high degree of palatability to animals to be rapidly prepared without affecting the desired particulate or pellet form of the food or causing it to become unduly mushy. Further, through the novel process of the invention, it has been found that thickening agents may be conveniently coated onto the surface of animal food pellets by moistening the surface of the pellets as by exposing the pellets to steam or a mist of water. Surprisingly, it has been found that the particles of thickening agent will adhere to the moistened surface of the pellets sufficiently to hold the thickening agent thereon until use and to permit substantially instantaneous dissolution of the thickening agent upon being contacted with water.

Additionally, through the process of the invention, the fat coated and impregnated particles or pellets are characterized by a higher fat content than the prior art product referred to above and a deeper penetration of the fat into the pellets than in said prior art product. This is accomplished by applying hot fat to the pellets while the pellets are hot and thereafter heating the fat coated pellets to increase the penetration of the fat into the pellets. The deeper penetration of fat into the pellets decreases the tendency of the pellets to have a greasy appearance which characterizes pellets having a surface coating of fat or a coating which only slightly penetrates the surface of the pellets. Further, the deeper penetration of the fat into the pellets reduces the likelihood that the animal will lick or eat only the outside portion of the pellets leaving the remaining nonfat containing portion unconsumed.

In general, the process of manufacturing the novel animal food product of the present invention includes the steps of forming a blended mixture containing farinaceous grain material and proteinaceous material, forming the mixture into an expanded product of pellet form and of lower moisture content by extruding the mixture under pressure, drying the expanded product to further reduce its moisture content, separating the dried, expanded product into first and second streams, applying hot liquid fat to the expanded product in the first stream while the product is hot, heating the resultant fat coated product to increase the temperature of the product and to cause the fat to penetrate more deeply into the product, moistening the surface of the expanded product in the second stream and mixing a thickening agent therewith, the thickening agent being loosely adhered to the expanded product by the moisture on the surface thereof, and thereafter mixing the first and second streams together.

As the starting mixture of farinaceous grain material and proteinaceous material, any mixture may be used which will supply the desired balance of these two materials. Such mixtures are well known to those skilled in the art and may also include minerals, vitamin, flavoring agents and coloring agents. Exemplary farinaceous grain materials include corn, oats, rye, barley, wheat, flour and other cereal grains and exemplary proteinaceous materials include soybean meal, meat meal, peanut meal, corn meal, poultry meal, fish meal, corn gluten meal and the like. The individual components of the mixture of farinaceous grain material and proteinaceous material are mixed together and blended in the desired proportions, and the resulting mixture is then screened to remove any large lumps of material therefrom. Typically, the moisture content of the mixture after blending is approximately 12–13%.

After screening, the mixture is metered into a conditioner which may be a wet mix conveyor, for example, and which imparts a further blending action to the mixture. In the conditioner, steam and/or hot water are added to the mixture and the moisture content is increased from approximately 12–13% to about 28–30%. A coloring agent such as a vegetable dye may be dissolved in the hot water added to the mixture in the conditioner in order to impart the desired color to the finished product. The mixture is conveyed through the conditioner in approximately 30 seconds or less and the average temperature during this residence time of the mixture in the conditioner is approximately 150° F. so that there is no appreciable gelatinization of starch in the farinaceous grain material in the conditioner.

The hot mixture exiting from the conditioner is then subjected to an extrusion operation in order to obtain an expanded product of pellet form and of the desired lower moisture content. Preferably, a barreled, high pressure extruder which operates at pressures on the order of 600–800 p.s.i. or higher and temperatures of approximately 300–340° F., is employed. Under these pressure and temperature conditions, gelatinization of starch in the farinaceous grain material occurs. The pressure drop across the orifice of the extruder may be varied to vary the degree of expansion of the extruded product. The expanded, extruded product from this extrusion operation has a temperature above 212° F. and a moisture content of approximately 23–25%, i.e., a loss of approximately 5% of the moisture content occurs during the extrusion operation.

The expanded, extruded product obtained from the extruder is in the form of pellets. The term "pellet" as employed herein designates the various forms which the expanded, extruded product from the extrusion operation may assume. As is known to the art, pellets of various forms may be obtained by using dies of the desired configurations.

The output of pellets from the extruder is transported through an air syrtem and ambient air is drawn into the system to effect some cooling and drying of the pellets as they are being conveyed to and into a drying oven. Typically, the pellets may be cooled down to about 100° F. and the moisture content reduced to approximately 17–18% before the pellets enter the drying oven. The temperature in the drying oven is maintained at a level, generally between 215–265° F., such that the temperature of the pellets exiting from the oven is approximately 140–150° F. This drying operation generally requires about 15 minutes and further reduces the moisture content of the pellets to about 8–12%.

After drying, the pellets are again screened to remove any fines and separation of the pellets into two streams is then effected through the use of a mechanical separator. One stream contains pellets to which a fat is to be applied and the other stream contains pellets to which a thickening agent is to be applied. Separation of the pellets is effected so that the first or former stream contains 80–95%, preferably 90%, of the pellets and the second or latter stream contains 5–20%, preferably 10%, of the pellets. These respective proportions of the two streams of pellets insure that the final product contains a sufficient quantity of pellets coated with a thickening agent to provide a thickened aqueous animal food mixture of the desired consistency and palatability.

The pellets in the first stream are fed, while hot (e.g., at a temperature of about 130° F.) into a spray chamber in which they are sprayed with a hot liquid fat in general accordance with the method described in Lanz Patent 2,945,764, dated July 19, 1960. Preferably, the temperature of the liquid fat is approximately 140–160° F. and the fat is sprayed through nozzles onto the pellets in the form of a mist as the pellets fall through the spray chamber. Because the pellets are hot as they enter the spray chamber, the fat sprayed onto the pellets not only forms a surface coating on the pellets but also remains fluid for a longer period of time and penetrates into the pellets more deeply than would be the case if the pellets entered the spray chamber after being cooled to a lower temperature.

Any animal fat such as beef tallow or poultry tallow or any vegetable fat such as soybean oil, may be used in the practice of the invention for spraying the pellets in the first stream. However, the use of animal fats which are normally solid at room and ambient temperatures, is preferred. The amount of fat added to the pellets may range from 2–10% (e.g., 6.9%), based upon the weight of the pellets, and the use of higher amounts of fat within this range is generally preferred.

From the spray chamber, the fat coated pellets are conducted into a rotating drum which is heated to maintain its surface temperature at approximately 300° F. Depending upon atmospheric temperature conditions, the temperature of the pellets entering the drum from the spray chamber may range from 110° F. to 130° F. In travelling through the rotating drum, the pellets are heated and their temperature is increased so as to cause the fat applied in the spray chamber to penetrate more deeply into the pellets. This is desirable not only to minimize the greasy appearance which the pellets would otherwise have if all the fat applied remained on and near the surface of the pellets, but also to minimize the tendency of animals to lick or eat only the outside portion of the pellets which tendency is prevalent when the fat does not sufficiently penetrate the interior of the pellets. The pellets exiting from the heated, rotating drum have a temperature on the order of 8° higher than the pellets entering the drum, i.e., a temperature of approximately 118–138° F. depending upon atmospheric temperature conditions.

If desired, a flavoring agent such as fish meal and/or a coloring agent such as any suitable animal or vegetable dye (to color the aqueous mixture formed from the final product) may be added to the fat coated and impregnated pellets in the drum. The amount added may range from 1–10% by weight based upon the weight of the pellets. The flavoring agent and coloring agent are mixed together, metered into the drum and the mixture sprinkled onto the pellets as they travel through the drum. The pellets exiting from the drum thus have a surface coating of fat, fat penetrated into the interior of the pellets and the mixture of the flavoring agent and coloring agent loosely adhered to the surface of the pellets.

Meanwhile, the pellets in the second stream mentioned above are conducted into a rotating, unheated drum having water nozzles at spaced intervals along the length thereof. Here again, depending upon atmospheric temperature conditions, the temperature of the pellets entering the drum may range from 110° F. to 130° F. In the drum, the pellets are exposed to a mist of water or to steam which moistens the surface of the pellets. A thickening agent is separately metered into the drum and adheres to the moistened surface of the pellets to a sufficient extent to subsequently hold the particles of thickening agent thereon. It is believed that the water moistens the surface of the pellets and that particles of the thickening agent adhere to and coat the mostened surface. As they move through the drum, the coated pellets are then moistened again by the mist of water and an additional coating of thickening agent becomes loosely adhered to the moistened surface. This continues as the pellets move through the drum until multiple layers or coatings of thickening agent build up on the surface of the pellets. Preferably, moistening of the pellets and mixing of the thickening agent therewith is effected relatively simultaneously or the mixing may slightly precede the moistening. Moistening the pellets may also precede mixing of the thickening agent therewith, although this may not result in the adherence of as great a proportion of the particles of thickening agent to the pellets. In any event, the pellets exiting from the drum have loosely adhered surface coatings of the thickening agent which are readily available for contacting by water or an aqueous liquid for rapid dissolution of the thickening agent.

The amount of water or steam added to the pellets during this operation is controlled so that the pellets exiting from the drum have a moisture content of less than 14% which is the amount generally required for mold growth. Thus, since the moisture content of the pellets entering the drum is generally between 8% and 12%, the amount of moisture added in adhering the thickening agent to the pellets ranges between approximately 2% and 6%. This amount of moisture is sufficient to loosely adhere particles of the thickening agent to the pellets but insufficient to cause any appreciable dissolution of the thickening agent in the water or steam added during this operation. As mentioned, steam or water, preferably in the form of a mist or spray, may be employed to moisten the surface of the pellets and effect adherence of the thickening agent thereto. If desired, the water employed may have flavoring materials therein to enhance the palatability of the final product. For example, aqueous solutions such as tuna cooker juice (drippings from tuna cooking operations), molasses water, and water containing fish solubles, may be employed for moistening the surface of the pellets.

Various thickening agents may be used in the practice of the invention and function to dissolve upon being contacted with water to thicken the aqueous mixture formed and to improve the flavor and/or palatability of the mixture or to impart a gravy-like consistency and viscosity to the mixture. Among useful thickening agents may be mentioned a water soluble salt of carboxy methyl cellulose such as sodium or potassium carboxy methyl cellulose, copra (ground coconut shell), hydrolyzed vegetable protein, whey, powdered onion, powdered garlic, pyrogenic silica and the like. Other useful thickening agents will occur to those skilled in the art. Preferably, a small amount of a coloring agent, such as an animal, vegetable or other dye, is mixed with the thickening agent for addition to the pellets. In the case of carboxy methyl cellulose salts, it has been found that the use of iron oxide is especially satisfactory in that it not only imparts the desired color to the carboxy methyl cellulose salt employed and thereby eliminates the undesirable whitish appearance of carboxy methyl cellulose salts, but also functions as a nonagglomerating agent and coats the carboxy methyl cellulose salt particles and prevents them from agglomerating after water is added thereto in the drum and before the mixture becomes adhered to the surface of the pellets. Other nonagglomerating agents such as calcium carbonate, carbon black, silica and various metal salts may be used, but may require the addition of a coloring agent to impart a color compatible with the desired color of the final thickened aqueous mixture or gravy. In general, the amount of thickening agent added to the pellets in this operation ranges between approximately 5% and 15% based upon the weight of the pellets.

Depending upon whether or not steam or water is used in adhering the thickening agent to the pellets and the particular temperature of the water or steam employed, the temperature of the pellets exiting from the rotating drum in which the thickening agent is added, may range from about 100° F. to 140° F.

The pellets in the first stream to which fat has been applied and the pellets in the second stream to which a thickening agent has been applied are then remixed and cooled in a rotating drum. This requires about 1–2 minutes and the pellets of the final animal food product from this drum have a temperature on the order of 100° F. and are ready for packaging.

The novel animal food product produced by the process described above is characterized by the formation of a thickened liquid mixture upon the addition thereto of several parts by weight of water or an aqueous liquid such as milk or the like. The formation of this thickened mixture occurs relatively rapidly by reason of the ready availability of the thickening agent for contact with and dissolution by the water or other aqueous liquid added. The formation of the thickened mixture may be further expedited by stirring of the animal food—liquid mixture. The addition of water or other aqueous liquid to the animal food of the invention also results in liquefaction of the fat on the fat coated and impregnated pellets, the degree and rapidity of liquefaction being in part determined by the temperature of the water added. For more rapid liquefaction, the use of warm water (i.e., temperature of 110–140° F.) is preferred. The thickened, aqueous mixture produced upon addition of water to the animal food of the invention is highly nutritional and palatable and yet, under normal conditions of use, retains its essential particulate or pellet form until consumed by the animal.

The following examples illustrate the invention.

Example 1

An animal food in pellet form was prepared using the following mixture of farinaceous grain material and proteinaceous material as the starting material.

| Component: | Percentage by weight |
|---|---|
| Yellow corn | 33.00 |
| Fish meal | 5.38 |
| Meat scrap | 38.40 |
| Soybean meal (50% protein) | 10.75 |
| Skim milk | 7.63 |
| Mineral premix | 3.76 |
| Vitamin premix | 1.08 |
| | 100.00 |

The components of the above mixture were metered out in the proportions stated and mixed and blended together. The resulting blended mixture had a moisture content of 12%. A charge of this mixture was screened (No. 8 screen) to remove large lumps and conveyed to a holding bin.

From the holding bin, the mixture was fed into a volumetric feeder from which it was metered into a wet mix conveyor. The mixture travelled through the conveyor at an average temperature of 150° F. in approximately 30 seconds during which time steam and hot water were added to increase the moisture content of the mixture to approximately 29%.

The mixture from the conveyor was fed by gravity into the input hopper of a barreled extruder operating at a temperature of 320° F. and a pressure of 800 p.s.i. During extrusion, the mixture was expanded and then automatically cut into pellets of S shape, $3/16''$ thick and measuring $1/2'' \times 1/2''$ in overall dimension. The pellets had a moisture content of approximately 24%.

The pellets were transported from the extruder through an air system in which the temperature of the pellets was reduced to approximately 100° F. and the moisture content to 18%. From the air system, the pellets were deposited onto a belt and conveyed into a drying oven operating at a temperature of approximately 245° F. After 15 minutes in the drying oven, the pellets coming out of the oven had a temperature of approximately 145° F. and a moisture content of approximately 9.6%.

The pellets from the oven were screened to remove fines and were then conducted to a mechanical separator in which the pellets were divided into two streams, the first containing approximately 90% of the pellets and the second containing approximately 10% of the pellets.

The first stream of pellets, while hot, was fed into a spray chamber wherein hot liquid beef tallow at a temperature of 140° F. and in the form of a mist was sprayed through nozzles onto the pellets as they fell through the chamber. The pellets from the spray chamber fell directly into a rotating drum heated by means of infrared heating elements to raise the surface temperature of the drum to 300° F. A mixture of fish meal and a vegetable dye was metered into the drum and sprinkled onto the pellets as they were conveyed through the drum. The mixture became loosely adhered to the fat coating on the surface of the pellets. The amount of the mixture added was about 2% by weight, based upon the weight of the pellets. The pellets coming out of the rotating drum had a temperature of 130° F.

The second stream of pellets was fed by gravity directly into an unheated, rotating drum in which a water mist at the rate of about 6%, based upon the weight of the pellets, was directed onto the pellets. At the same time, a mixture of sodium carboxy methyl cellulose and iron oxide (ball-milled to obtain a homogeneous dispersion) was metered into the drum and became loosely adhered to the moistened surface of the pellets. The amount of the mixture added was about 11% by weight, based upon the weight of the pellets. The pellets came out of the drum at a temperature of approximately 110° F. and had a moisture content of 13.2%.

The first and second streams of pellets were then conveyed to a rotating drum and thoroughly mixed together and the mixture cooled to a temperature of approximately 100° F.

This product, upon the addition of moderately warm water, was found to give a thickened aqueous mixture which was palatable to dogs and cats.

Example 2

Example 1 was repeated to prepare animal food in pellet form except that the following mixture of farinaceous grain material and proteinaceous material was used as the starting material.

| Component: | Percentage by weight |
| --- | --- |
| Oats | 16.13 |
| Milo | 19.03 |
| Fish meal | 21.50 |
| Meat scrap | 20.11 |
| Soybean meal (50% protein) | 5.38 |
| Cottonseed meal | 5.38 |
| Skim milk | 7.63 |
| Mineral premix | 3.76 |
| Vitamin premix | 1.08 |
| | 100.00 |

Results similar to those described in Example 1 were obtained.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. The process of manufacturing animal food in particulate form comprising the steps of forming a blended mixture containing farinaceous grain material and proteinaceous material, forming said mixture into an expanded product of lower moisture content by extruding the mixture under pressure, drying said expanded product to further reduce its moisture content to about 8–12%, separating the dried, expanded product into a first stream containing between approximately 80% and 95% by weight of said expanded product and a second stream, containing between approximately 5% and 20% by weight of said expanded product, applying hot liquid fat to the expanded product in said first stream while said product is hot, heating the resultant fat coated product to increase the temperature of said product and thereby cause the fat to penetrate more deeply therein, moistening the surface of the expanded product in said second stream and mixing a thickening agent therewith whereby the thickening agent becomes adhered to the surface of said expanded product, the resultant product in said second stream having a moisture content of less than approximately 14%, and thereafter mixing said first and second streams together.

2. The process of manufacturing animal food in pellet form comprising the steps of forming a blended mixture containing farinaceous grain material and proteinaceous material, forming the mixture into pellets of lower moisture content by extruding the mixture under pressure and at elevated temperatures, drying said pellets to further reduce their moisture content to about 8–12%, separating the pellets into a first stream containing approximately 90% by weight of said pellets and a second stream containing approximately 10% by weight of said pellets, spraying hot liquid fat on the pellets in said first stream while said pellets are hot, heating the resultant fat coated pellets to increase the temperature of said pellets and thereby cause the fat to penetrate more deeply therein, moistening the surface of the pellets in said second stream and mixing a water soluble thickening agent therewith whereby the thickening agent becomes loosely adhered to the surface of said pellets, the resultant product in said second stream having a moisture content of less than approximately 14%, and thereafter mixing said first and second streams together.

3. The process of manufacturing animal food in pellet form comprising the steps of forming a blended mixture containing farinaceous grain material and proteinaceous material, forming said mixture into pellets of lower moisture content by extruding the mixture under a pressure in excess of 600 p.s.i. and at a temperature in excess of 300° F., drying said pellets to further reduce their moisture content to about 8–12%, separating the pellets into a first stream containing approximately 90% by weight of said pellets and a second stream containing approximately 10% by weight of said pellets, spraying hot liquid fat on the pellets in said first stream while said pellets are hot, heating the resultant fat coated pellets to increase the temperature of said pellets and thereby cause the fat to penetrate more deeply into the interior of said pellets, moistening the surface of the pellets in said second stream and mixing a water soluble thickening agent therewith to loosely adhere said thickening agent to said pellets, the resultant product in said second stream having a moisture content of less than approximately 14%, and thereafter mixing said first and second streams together.

4. The process of manufacturing animal food in pellet form comprising the steps of forming a blended mixture containing farinaceous grain material and proteinaceous material, forming said mixture into pellets of lower moisture content by extruding the mixture under a pressure in excess of 600 p.s.i. and at a temperature in excess of 300° F., drying said pellets to further reduce their moisture content to about 8–12%, separating the pellets into a first stream containing approximately 90% by weight of said pellets and a second stream containing approximately 10% by weight of said pellets, spraying hot liquid fat on the pellets in said first stream while said pellets are hot, heating the resultant fat coated pellets to increase the temperature of said pellets and thereby cause the fat to penetrate more deeply into the interior of said pellets, moistening the surface of the pellets in said second stream and mixing the pellets with a mixture of a water soluble thickening agent and a nonagglomerating agent to loosely adhere said mixture to said pellets, the resultant product in said second stream having a moisture content of less than approximately 14%, and thereafter mixing said first and second streams together.

5. The process as defined in claim 1 wherein said thickening agent is a water soluble salt of carboxy methyl cellulose.

6. The process as defined in claim 4 wherein said thickening agent is a water soluble salt of carboxy methyl cellulose and said nonagglomerating agent is iron oxide.

References Cited

UNITED STATES PATENTS

| | | | |
|---|---|---|---|
| 3,348,954 | 10/1967 | Green | 99—140 |
| 3,290,158 | 12/1966 | Treat | 99—143 |
| 3,139,342 | 6/1964 | Linskey | 99—2 |
| 3,119,691 | 1/1964 | Ludington et al. | 99—2 |
| 3,014,800 | 12/1961 | Guidarelli | 99—7 |
| 2,945,764 | 7/1960 | Lanz | 99—4 |

MAURICE W. GREENSTEIN, Primary Examiner

H. H. KLARE III, Assistant Examiner